United States Patent [19]

Norris et al.

[11] Patent Number: 4,461,554
[45] Date of Patent: Jul. 24, 1984

[54] SELF-REELING CASSETTE DRIVEN BY THE MOTION OF AN INSERTED WEB

[75] Inventors: John Norris, Upton St. Leonards; Otto C. Selden, London, both of England

[73] Assignee: Allied Corporation, Morris Township, Morris County, N.J.

[21] Appl. No.: 309,628

[22] Filed: Oct. 8, 1981

[51] Int. Cl.³ .............................................. G03B 17/26
[52] U.S. Cl. ....................................... 354/275; 242/76
[58] Field of Search .......................... 354/212, 275, 5; 352/78 R; 242/71.1, 76, 192; 226/91, 189, 170, 171

[56] References Cited

U.S. PATENT DOCUMENTS

| 3,978,495 | 8/1976 | Warscheit | 354/275 |
| 4,034,929 | 7/1977 | Ebner | 242/71.1 |
| 4,218,032 | 8/1980 | Nagel et al. | 242/71.1 |
| 4,248,512 | 2/1981 | Robbins | 354/275 |
| 4,299,458 | 11/1981 | Burton | 354/275 |

FOREIGN PATENT DOCUMENTS 1205379 11/1965 Fed. Rep. of Germany ...... 354/275
536662 5/1941 United Kingdom ............ 352/78 R

OTHER PUBLICATIONS

IBM Technical Disclosure Bulletin, Forshee, et al., vol. 13, No. 6, Nov. 1970, p. 1508.

Primary Examiner—A. A. Mathews
Attorney, Agent, or Firm—Joel I. Rosenblatt

[57] ABSTRACT

A drum is mounted rotationally in a cassette. A series of roller shafts are arranged around the drum and move radially. A web inserted into the cassette is forced against the drum by the roller shafts and causes the drum to move in frictional engagement with the web. As additional web material is forced into the cassette, convolutional layers of the web built on the drum forcing the roller shafts outwardly and permitting the drum to wind the web without any rotational motion imparted to the drum except for that of the web.

16 Claims, 7 Drawing Figures

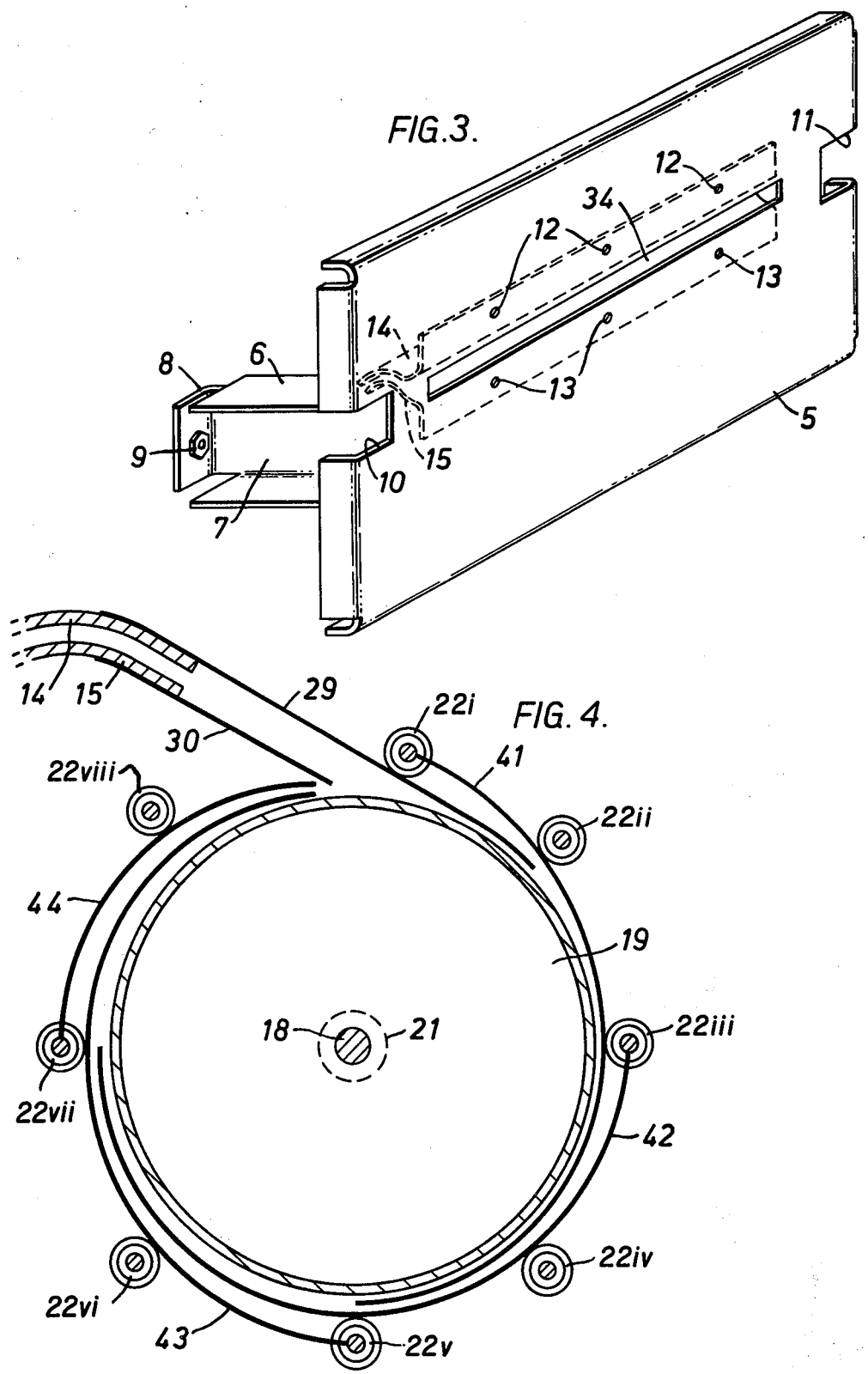

SELF-REELING CASSETTE DRIVEN BY THE MOTION OF AN INSERTED WEB

The present invention relates to web dispensers and receivers, hereinafter called cassettes and particularly to cassettes for dispensing and receiving light sensitive film as from a camera or photocomposing machine.

It has been customary to provide film cassettes on photocomposing machines which are simply boxes to receive exposed film, but these devices suffer the disadvantage that only relatively short lengths of film can be fed into them as the film follows no set path and can start folding back on itself. Some cassettes may be provided with drive means whereby the exposed film is positively pulled into the cassette. To provide the drive for the cassette is relatively expensive and requires care to ensure that the drive pulling film into the cassette is compatible with the machine processing speed to ensure that the film is neither under nor over fed.

An object of the present invention is to provide a cassette which will readily accept exposed film and will allow that film freely to be fed into the cassette without drive means being associated with the cassette.

Another object of the invention is to provide a cassette which can be used initially to supply unexposed light sensitive film to, for example, a photocomposing machine or camera, and when the cassette has been exhausted of film, use the cassette to receive exposed film.

According to the present invention there is provided a cassette for the receipt of light sensitive film including a light tight box with a light trap feed slot into the box and means totally enclosed within the box ensuring that the film is evenly wound upon itself as it is pushed into the cassette.

Likewise according to the present invention there is provided a cassette including a light box, a light trap feed slot into the box, a drum rotatably mounted within the box, guide means to guide a web substantially tangentially onto or from the drum, a plurality of guides positioned circumferentially around the drum to hold the web resiliently against the drum and allow the web to be wound onto or from the drum by pushing or pulling the web into or out of the cassette.

In the accompanying drawings which show examples of cassette according to the present invention;

FIG. 3 is a perspective view of the cassette front plate.

FIG. 4 is a cross section of a film receiving drum showing the position of the film guiding means.

Figure 1:
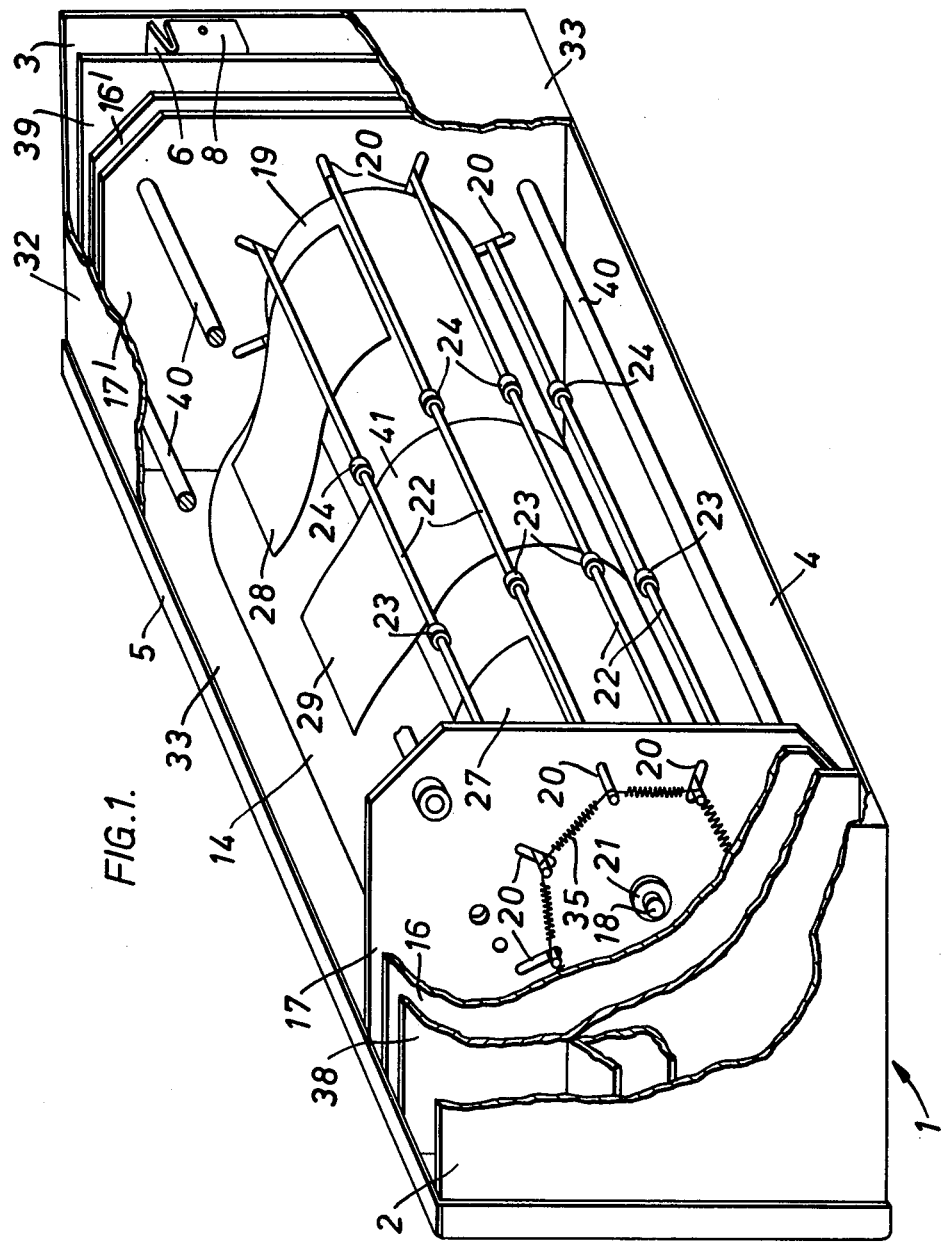
FIG. 1 is a part sectional perspective view of the cassette with top and back removed.
Figure 2:
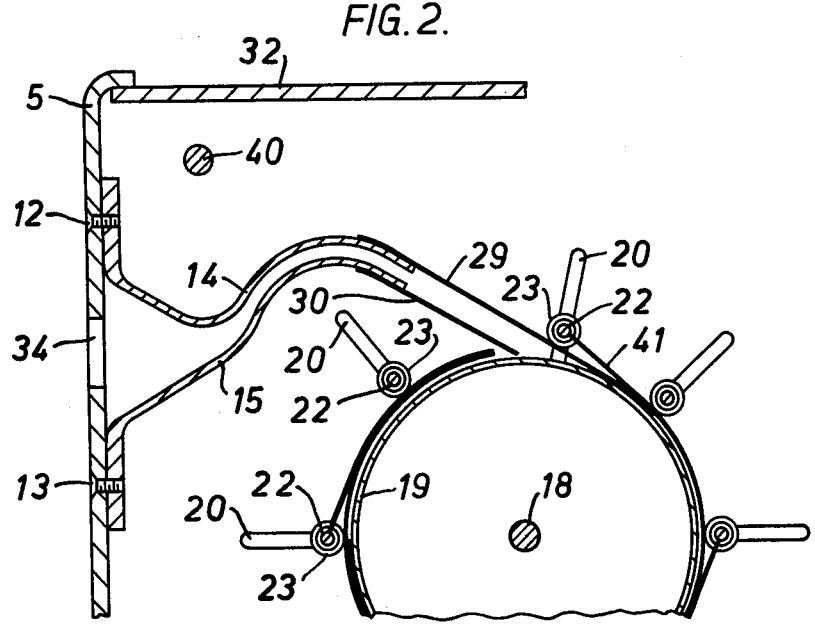
FIG. 2 is a scrap cross section showing the film inlet system.

Referring to FIG. 1, a cassette body, generally designated 1 comprises end walls 2, 3, a bottom 4, a top panel 32 a back panel 33, and intermediate walls 38, 39.

A front panel 5 (FIG. 3) is provided with a slot 34 through which web, for example light sensitive film, is fed into or out of the cassette.

At each side of the front panel 5 is welded or otherwise secured a flat bottom U-shaped member 6, the bottom 7 of the member extending beyond the walls of the "U" and is bent through a right angle to form a flat portion 8 to abut against the face of the rear wall 33 of the cassette.

The front panel 5 is inserted into the cassette so that the "U"-shaped members 6 at each end of the front panel 5 each pass between the end walls 2, 3 and intermediate walls 38, 39; the front panel 5 is secured to the cassette body by means of screws passing through the rear wall and engaging in nuts 9 on the flat portion 8.

Slots 10, 11 are cut in the front panel 5 whereby the cassette can be located and retained on spigots which project from a photocomposing machine, not shown, in well known manner.

Screwed to the front panel 5 by sets of screws 12, 13 are upper and lower light trap plates 14, 15 respectively in spaced relationship to each other and extending rearwardly from the slot 34.

The light trap plates 14, 15 cooperate to provide a light tight entrance to the cassette.

Secured to each of the end walls 2, 3 of the cassette is a pair of drum plates, each pair comprising an outer drum plate 16, 16' and an inner drum plate 17, 17'. Each pair of inner and outer drum plates are spaced apart by spacer blocks, not shown, and the whole structure held rigid by four cross rods 40 (only three of which are shown in FIG. 1).

The inner drum plates 17, 17' each carry a bearing 21 supporting journals of a drum supporting shaft 18 of a drum 19. Conveniently the drum 19 comprises a cylinder provided with end caps through which passes the supporting shaft 18. Alternatively, the end caps may have trunnions secured to them, the trunnions being carried in the bearings 21.

A number of slots 20, for example, eight, in the inner drum plates 17, 17' extend radially from the axis of rotation of the drum.

Extending between the inner drum plates and located in each slot 20 is a roller shaft 22. The ends of each roller shaft 22 extends into the space between the inner and outer drum plates. The roller shafts 22 are identified in FIG. 4 by references i to viii.

Each roller shaft carries two rollers, 23, 24 conveniently ball bearings, the outer race of which contacts the surface of the drum 19. The bearings are located on the roller shafts by means of circlips, not shown, engaging in slots on the roller shafts on either side of each ball bearing.

To maintain light resilient pressure radially between the rollers 23, 24 and the surface of the drum 19, an endless helical spring 35 is passed round the ends of the roller shaft 22 which extend into the space between the inner and outer drum plates. Alternatively light helical springs may be provided, hooked at one end to each roller shaft and at the other end to the drum shaft, thereby resiliently urging each of the roller shafts towards the inner end of its slot.

Two laterally spaced upper control strips 27, 28 are secured to the upper light trap plate 14.

The upper control strips 27, 28 extend tangentially to the surface of the drum 19, pass under the roller shaft 22ii and terminate adjacent the roller shaft 22ii.

A central strip 29 is secured to the upper light trap plate 14 and passes under the rod 23i to terminate adjacent the roller shaft 22ii.

A central strip 30 is secured to the lower light trap plate 15. This strip contacts the surface of the drum 19 and ends before the roller shaft 22ii.

The guide strips are lightweight and flexible and may be made from, for example, melamine film.

Pivotally and centrally mounted on the roller shaft 22i is a guide strip 41 which extends over the strip 29, passes under the roller shaft 22ii, 22iii, and 22iv and terminates adjacent the roller shaft 22v. A second guide strip 42 is pivotally mounted on the roller shaft 23iii, extends over the guide strip 41 passes under the roller shafts 22iv, 22v and 22vi and terminates adjacent the roller shaft 22vii. A third guide strip 43 is pivotally mounted on the roller shaft 22v, extends over the guide strip 42 passes under the rods roller shaft 22vi, 22vii and 22viii and terminates under the control strip 30.

A fourth guide strip is pivotally mounted on the roller shaft 22vii, extends over the guide strip 43, passes under the roller shaft 22viii and terminated adjacent the control strip 30, that is, it does not interpose between the strip 30 and drum 19.

In operation it is assumed that the cassette is to be used to receive exposed light sensitive film from a photocomposing machine.

The cassette is loaded into the photocomposing machine and the leading edge of the exposed film from the photocomposing machine enters the slot 34 and between the upper and lower light trap plates 14, 15 and is guided by the upper and lower control strips 29, 30 onto the surface of the drum 19.

As light sensitive film is exposed in the photocomposing machine so it is pushed into the cassette and the film advances, rotating the drum 19.

The film is retained in contact with the surface of the drum in the first drum rotation by the rollers 23, 24 and the guide strips 41, 42, 43 and 44 associated with the rollers.

Continued feeding of the film causes continued rotation of the drum as the film is taken up by the drum, the increasing layers of film causing the rollers 23, 24 to move their carrying shafts radially away from the drum shaft 18 in their slots 20 against the resilient action of the springs 35. At the same time the overall diameter of the drum and film increases and this causes relative motion between the guides 41, 42, 43 and 44 as the effective circumference of the drum and film covered by the guides increases. The overlap of the guides ensures however that the guides maintain effective control over the film and present a continuous unbroken surface ensuring that the film is wound smoothly onto the drum.

Figure 6:
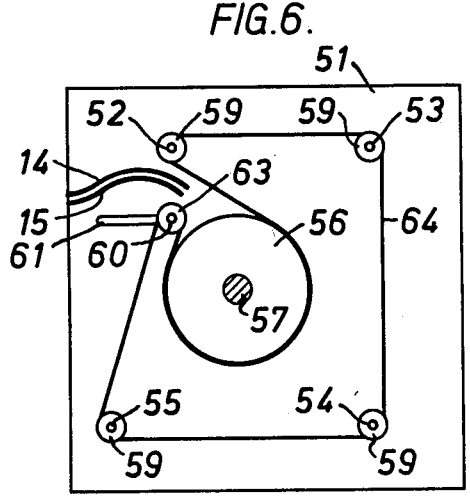
FIG. 6 is a schematic cross section of FIG. 5 showing the portion of the film guiding means and FIG. 7 is a modification of the example shown in FIGS. 5 and 6.
Figure 5:
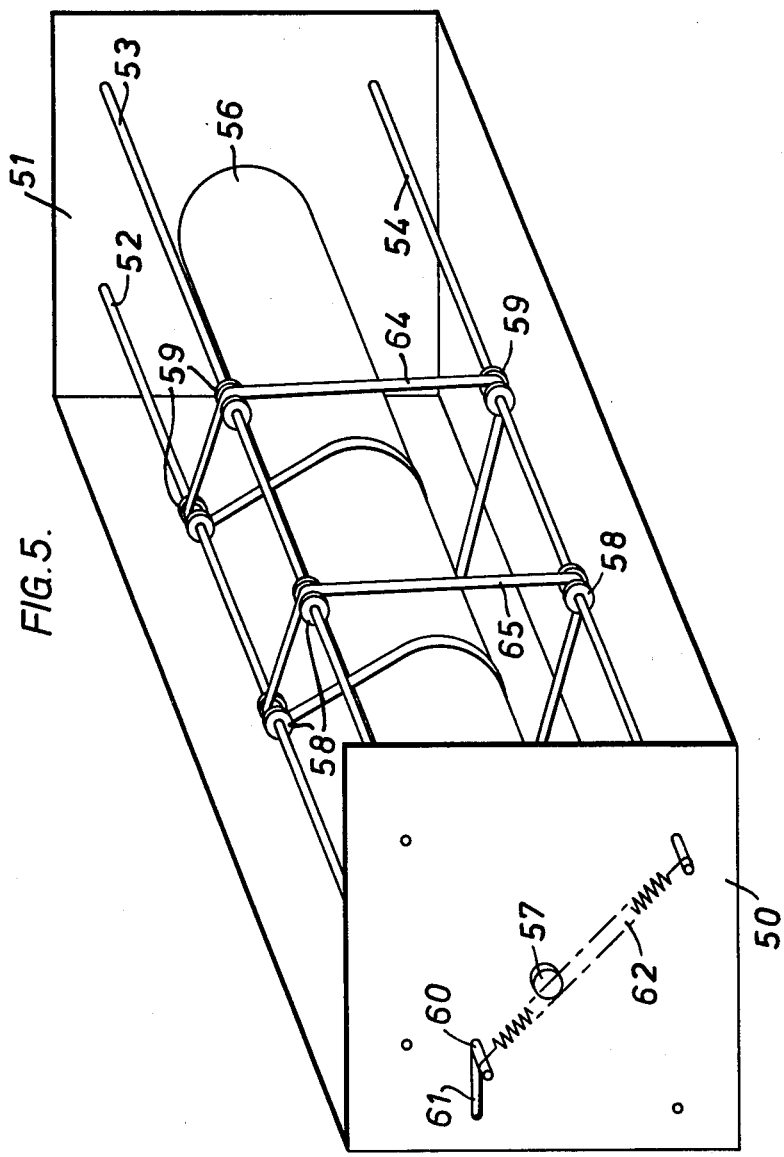
FIG. 5 is a perspective view of another example of cassette with top, back and end plates removed.

In the example, FIGS. 5 and 6, there is shown an alternative means to the guide strips for guiding the exposed film and ensuring that it is evenly wound onto the drum.

As in the previous example, a light tight box is provided for receiving the assemblage shown in FIG. 5. A front plate identical to that shown in FIG. 3 is provided, and exposed film is fed through the slot 34 and into the light trap upper and lower plates 14, 15.

End plates 50, 51 are rigidly spaced apart by cross rods 52, 53, 54 and 55.

A drum 56 is mounted on a shaft 57 carried in bearings in the end plates.

Each of the cross rods 52, 53, 54 and 55 has two laterally spaced pulley wheels 58, 59 mounted on it. The pulleys are freely rotatable but cannot move laterally on the rods.

A cross rod 60 extends at its ends through slots 61 in the end plates 50, 51.

A helical spring 62 is secured at one end to the cross rod 60 and at the other end to an extension on the rod 54. A similar spring is provided at the other end of the cross rod 60.

These helical springs resiliently urge the cross rod 60 to the bottom of the slot 61 adjacent the drum 56.

Two laterally spaced pulleys 63 are carried on the cross rod 60, the pulleys are identical with the pulleys 58, 59.

A resilient endless band 64 passes over the pulley wheels 59, carried on the cross rods 52, 53, 54, 55, and the pulley wheel 63 on the cross rod 60. An identical band 65 passes over the pulley wheels 58.

The course followed by the band 64, is clearly shown in FIG. 6; the band 65 follows an identical course.

In operation, exposed film is fed into the cassette and passes between the upper and lower light trap plates 14, 15 and enters the nip between the bands 64, 65 and the drum 56. Continued feeding of the film sets the whole system in motion and the film is evenly and smoothly fed onto the drum. As the layers of film build up on the drum, so the shaft 60 moves away from the drum, against the action of the helical springs 62, thus maintaining effective guidance to the film.

It will be seen that in this example, as the layers of film build up on the drum, so the pulleys 63 move away from the drum 56, but in so doing the effective path of the belts 64, 65 is increased and hence tension in the belts will increase. Within limits this tension increase can be tolerated and has no marked affect on the effectiveness of the system in guiding and holding film on the drum. But if the film layers increase beyond that limit the additional tension imposes frictional loads which are not acceptable.

Figure 7:
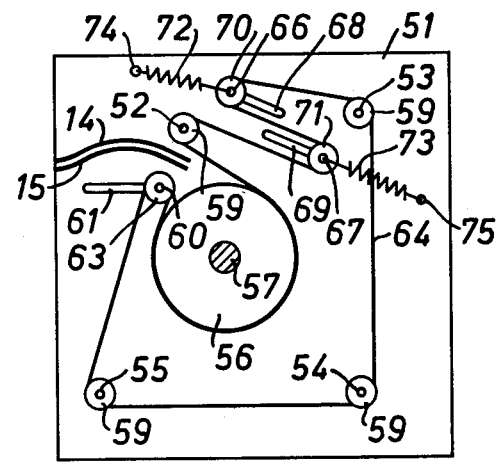

To meet this situation, the modification shown in FIG. 7 may be employed. Basically the system is identical with that shown in FIGS. 5 and 6 except that it introduces two sets of jockey wheels in the travel of the belts 64, 65 conveniently between the cross rods 52, 53.

Two rods 66, 67 extend between the end plates 50, 51, the ends of the shafts extending through slots 68, 69 respectively in the end plates.

A pair of pulley wheels 70, 71 are carried respectively by the rods 66, 67; the pulley wheels are laterally spaced on their rods.

The course of the belt 64 is as shown in FIG. 7i the belt 65 follows an identical course.

The rods 66, 67 are each resiliently urged to one end of the slots 68, 69 respectively by helical springs, 72, 73. Helical springs are provided at each end plate.

One end of each helical spring is hooked onto its associated rod, and the other end of the helical spring is anchored to a stud 74, 75 screwed into the end plate.

As film is fed into the system and is wound upon the drum, so the tension in the bands 64, 65 tends to increase, but this tension is released by the pulleys 70, 71 moving towards each other so that the effective tension in the system remains constant.

If desired the rods 66, 67 may be replaced byhelical springs, which carry the pulleys 70, 71. The helical springs are anchored at each end to the end plates 50, 51. If such helical springs are used, there is no requirement for the slots 68, 69 in the end plates.

Increase in the tension in the belts 64, 65 will cause the helical springs to flex so that the effective tension in the system remains constant.

In all the foregoing examples exposed light sensitive film is removed from the cassette for processing or unexposed light sensitive film is fed from the cassette simply by pulling on the end of the film protruding from the slot 34 whereupon the film will cause the drum to rotate and allow film to be pulled out of the cassette.

If desired the inside of the cassette can be black felted or flocked to assist in maintaining a light tight structure.

We claim:

1. A cassette for the receipt of a web, including a box having a feed slot into the box, and with a drum mounted therein for rotational movement, said box having a guide means, forcing the web to be wound onto the drum as it is pushed into the cassette, said guide means including pulleys, the said pulleys carrying belts which pass around the drum and are in contact therewith, whereby the web is fed into a nip between the belts and the drum surface affecting rotation of the drum as the web is pushed into the cassette.

2. The cassette according to claim 1, wherein said box includes rods and wherein said pulleys are carried by said rods, and wherein two laterally spaced apart pulleys are carried by each of said rods.

3. The cassette according to claim 2, wherein one of said rods is resiliently urged towards the periphery of the said drum.

4. The cassette according to claim 1, wherein tensioning means are provided to maintain even tension in the said belts as layers of film build on the drum.

5. The cassette according to claim 4, wherein the tensioning means includes at least one set of jockey pulleys resiliently urged against the tension imposed by the said belts.

6. The cassette according to claim 5, wherein said box includes rods resiliently mounted for opposing the tension imposed by the said belts and wherein each of said set of jockey pulleys is carried on said resiliently mounted rods.

7. The cassette according to claim 5, wherein each of said set of jockey pulleys is mounted on a resilient means.

8. A cassette for receiving a web and for winding the said web in a spiral roll, said cassette having a slot for receiving said web and contacting means for contacting said web as it is inserted through said slot and into the said cassette, said contacting means including a drum, moved in response to the movement of said web and forming the said web into a roll wound upon itself as the web is pushed into the cassette, said drum being mounted for rotational movement within the said cassette and said contacting means including guide means to guide the film into substantially tangential contact with the drum, and wherein said contacting means includes a plurality of said guide means, said guide means being positioned circumferentially around the drum and forcing said web towards the surface of said drum, said circumferentially positioned guide means being mounted for radial displacement relative to the said drum, and being displaced radially outward in response to increasing layers of the said web being wound upon itself, at least one of said circumferentially positioned guide means being resiliently urged towards the said drum, and said contacting means maintaining the web in contact with the drum surface during the first full drum rotation, and at least some of said circumferentially positioned guide means are sequential guide means sequentially positioned about the drum and extending over a circumferential arch of the drum and with at least a part of said circumferential guide means overlapping a portion of another of said sequential guide means.

9. The cassette according to claim 8, wherein said contacting means includes a plurality of roller shafts mounted opposite the said drum surface and wherein at least some of said circumferential guide means are mounted on a respective roller shaft and extend under a sequential guide means.

10. The cassette according to claim 9, wherein at least some of said sequential guide means are mounted on at least some of said roller shafts and extend over an arc of said drum in said circumferential direction, and where at least some of said circumferentially positioned guide means extend under a roller shaft successively located in the direction of drum rotation.

11. The cassette of claim 10, wherein at least some of said sequential guide means overlap each other by an arc of at least 45°, relative to the drum circumference.

12. The cassette of claim 10, wherein said guide means for guiding the said web into tangential contact includes upper and lower control strips for guiding the web from the said slot to the drum and into the said tangential contact with the drum.

13. The cassette of claim 12, wherein the said guide means are strips of resilient material.

14. The cassette of claim 12, wherein said guide means are a melamine like material.

15. The cassette of claim 14, wherein said strips are arcuately shaped.

16. The cassette according to claim 9, wherein said roller shafts have rollers mounted thereon, said rollers being urged toward said drum surface and driving said web into contact with the drum sufficiently to cause frictional engagement of the web and the drum, and causing the drum to be driven responsively to the force of the web.

* * * * *